(12) United States Patent
Marvaniya et al.

(10) Patent No.: US 11,010,562 B2
(45) Date of Patent: May 18, 2021

(54) VISUAL STORYLINE GENERATION FROM TEXT STORY

(71) Applicant: International Business Machines Corporation, Armonk, NY (US)

(72) Inventors: Smitkumar Narotambhai Marvaniya, Bangalore (IN); Padmanabha Venkatagiri Seshadri, Mysore (IN); Vijay Ekambaram, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 16/271,586

(22) Filed: Feb. 8, 2019

(65) Prior Publication Data

US 2020/0257763 A1    Aug. 13, 2020

(51) Int. Cl.
*G06F 40/10*     (2020.01)
*G06F 40/30*     (2020.01)

(52) U.S. Cl.
CPC .................................. *G06F 40/30* (2020.01)

(58) Field of Classification Search
CPC .......... G06F 40/00; G06F 40/30; G06F 40/35; G06F 40/10–109
See application file for complete search history.

(56) References Cited

U.S. PATENT DOCUMENTS 8,843,372 B1 *   9/2014   Isenberg .................. G10L 25/48
                                                                          704/250
9,317,534 B2     4/2016   Brandt
(Continued)

FOREIGN PATENT DOCUMENTS

WO    WO2015073530 A1    5/2015
WO    WO2016013885 A1    1/2016

OTHER PUBLICATIONS

Disclosed Anonymously, "Text to Video Converter", Technical Disclosure, IP.com No. IPCOM000246358D, Jun. 2, 2016, 8 pages, ip.com.

(Continued)

*Primary Examiner* — Abul K Azad
(74) *Attorney, Agent, or Firm* — Ference & Assocaites, LLC

(57) ABSTRACT

One embodiment provides a method, including: receiving a story, wherein the story is received in a text-based format; identifying conversational blocks contained within the story, wherein the identifying conversational blocks comprises (i) identifying conversational turns within the story, (ii) identifying topic switches between conversational turns, and (iii) grouping conversational turns occurring between topic switches into a conversational block; for each of the conversational blocks, obtaining at least one image illustrating the corresponding conversational block, wherein the obtaining comprises (i) extracting concepts from the conversational block and (ii) identifying images illustrating the concepts; and generating a visual storyline representing the story by ordering the images obtained for each of the conversational blocks, based upon an order of the conversational blocks within the story, wherein the generating comprises refining the images to maintain consistency between the images.

20 Claims, 3 Drawing Sheets

(56) References Cited

U.S. PATENT DOCUMENTS

| | | | |
|---|---|---|---|
| 9,552,515 B2 | 1/2017 | Chan et al. | |
| 2007/0147654 A1 | 6/2007 | Clatworthy et al. | |
| 2011/0078564 A1 | 3/2011 | Almodovar Herraiz et al. | |
| 2011/0283190 A1* | 11/2011 | Poltorak | H04L 12/2818 715/716 |
| 2016/0225187 A1 | 8/2016 | Knipp et al. | |
| 2017/0192961 A1 | 7/2017 | Dutta et al. | |
| 2017/0337841 A1 | 11/2017 | Styles | |
| 2018/0336794 A1* | 11/2018 | Chen | G06F 3/0481 |

OTHER PUBLICATIONS

Matthew Fisher et al., "Example-based Synthesis of 3D Object Arrangements", ACM Transactions on Graphics (Proc. SIGGRAPH Asia), 2012, 12 pages, ACM Digital Library.

Annamalai Narayanan et al., "graph2vec: Learning Distributed Representatives of Graphs", arXiv:1707.05005v1 [cs.AI], Jul. 17, 2017, 8 pages, ACM Digital Library.

Jure Leskovec et al, Website—node2vec: Scalable Feature Learning for Networks, SNAP, Accessed on Aug. 21, 2018, 2 pages, Stanford University, https://snap.stanford.edu/node2vec/.

Bijaya Adhikari et al., "Distributed Representation of Subgraphs", arXiv:1702.06921v1 [cs.SI], Feb. 22, 2017, 9 pages, ACM Digital Library.

Connelly Barnes et al., "Video Tapestries with Continuous Temporal Zoom", 2010, 8 pages, Copy available at: http://www.connellybarnes.com/work/publications/2010_tapestry_electronic.pdf.

Tao Chen et al., "Visual Storylines: Semantic Visualization of Movie Sequence", Computers & Graphics, Dec. 6, 2011, 10 pages.

Kathleen Ellen O'Neil, "Reading Pictures—Developing Visual Literacy for Greater Comprehension", The Reading Teacher, vol. 65, No. 3, Nov. 2011, 11 pages, International Literacy Association and Wiley.

* cited by examiner

VISUAL STORYLINE GENERATION FROM TEXT STORY

BACKGROUND

Learning to read can be a difficult and time consuming process. The process of learning to read is usually segmented into different steps, with each step introducing new concepts. For example, a person who is starting to learn to read may be presented with books that are mostly illustrations (e.g., pictures, images, drawings, etc.) with a few words describing the illustrations. The illustrations assist a person in associating words with known concepts as identified in the illustrations. As the reader progresses, the books generally use fewer illustrations and have more words to describe the story. In other words, books are generally written for a specific age range or reading level with the number and complexity of illustrations being correlated with the age range or reading level of the book. For example, a book developed for inexperienced readers may include a greater number of (and less complex) illustrations than a book developed for a more experienced reader.

BRIEF SUMMARY

In summary, one aspect of the invention provides a method comprising: receiving a story, wherein the story is received in a text-based format; identifying conversational blocks contained within the story, wherein the identifying conversational blocks comprises (i) identifying conversational turns within the story, (ii) identifying topic switches between conversational turns, and (iii) grouping conversational turns occurring between topic switches into a conversational block; for each of the conversational blocks, obtaining at least one image illustrating the corresponding conversational block, wherein the obtaining comprises (i) extracting concepts from the conversational block and (ii) identifying images illustrating the concepts; and generating a visual storyline representing the story by ordering the images obtained for each of the conversational blocks, based upon an order of the conversational blocks within the story, wherein the generating comprises refining the images to maintain consistency between the images.

Another aspect of the invention provides an apparatus, comprising: at least one processor; and a computer readable storage medium having computer readable program code embodied therewith and executable by the at least one processor, the computer readable program code comprising: a computer readable storage medium having computer readable program code embodied therewith and executable by the at least one processor, the computer readable program code comprising: computer readable program code configured to receive a story, wherein the story is received in a text-based format; computer readable program code configured to identify conversational blocks contained within the story, wherein the identifying conversational blocks comprises (i) identifying conversational turns within the story, (ii) identifying topic switches between conversational turns, and (iii) grouping conversational turns occurring between topic switches into a conversational block; for each of the conversational blocks, computer readable program code configured to obtain at least one image illustrating the corresponding conversational block, wherein the obtaining comprises (i) extracting concepts from the conversational block and (ii) identifying images illustrating the concepts; and computer readable program code configured to generate a visual storyline representing the story by ordering the images obtained for each of the conversational blocks, based upon an order of the conversational blocks within the story, wherein the generating comprises refining the images to maintain consistency between the images.

An additional aspect of the invention provides a computer program product, comprising: a computer readable storage medium having computer readable program code embodied therewith, the computer readable program code executable by a processor and comprising: computer readable program code configured to receive a story, wherein the story is received in a text-based format; computer readable program code configured to identify conversational blocks contained within the story, wherein the identifying conversational blocks comprises (i) identifying conversational turns within the story, (ii) identifying topic switches between conversational turns, and (iii) grouping conversational turns occurring between topic switches into a conversational block; for each of the conversational blocks, computer readable program code configured to obtain at least one image illustrating the corresponding conversational block, wherein the obtaining comprises (i) extracting concepts from the conversational block and (ii) identifying images illustrating the concepts; and computer readable program code configured to generate a visual storyline representing the story by ordering the images obtained for each of the conversational blocks, based upon an order of the conversational blocks within the story, wherein the generating comprises refining the images to maintain consistency between the images.

A further aspect of the invention provides a method, comprising: obtaining a text-based story; converting the text-based story into a dialog form, wherein the dialog form comprises conversational turns between at least two characters; identifying, from the dialog form, conversational blocks, wherein each of the conversational blocks comprises a plurality of conversational turns related to a topic; producing, for each conversational block, at least one illustration, wherein the producing comprises (i) obtaining a plurality of images and (ii) merging portions of the plurality of images to produce an illustration corresponding to the conversational block; and generating a visual storyline representing the story by ordering the at least one illustration produced for each conversational block based upon the story.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
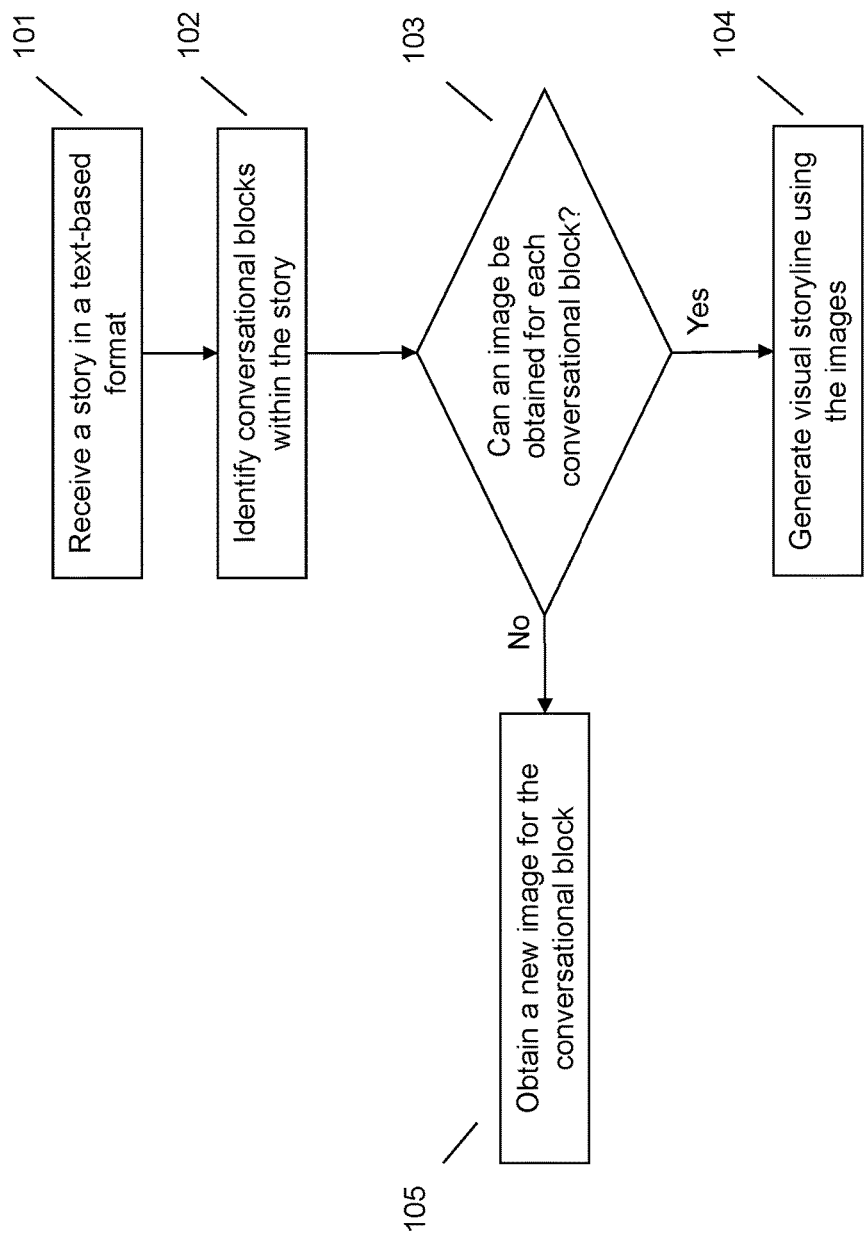
FIG. 1 illustrates a method of generating a visual story from a text-based story.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Even though books may be directed towards a particular reading level, readers of other experience levels may be interested in reading the book. In the case that a more experienced reader wants to read a book that is directed towards a less experienced reading level, the experienced reader will likely have no problems comprehending the book. However, in the case that a less experienced reader wants to read a book developed for more experienced readers, the less experienced reader may struggle with some of the concepts included within the book. Additionally, since the book is developed for a more experienced reader, the book will likely have fewer illustrations, thereby making it difficult for the less experienced reader to make associations between the illustrations and the text of the book. Additionally, readers may have trouble understanding concepts in books due to other factors, for example, the book may be written in a non-native language, the reader may not have an understanding of prerequisite concepts, the book may not include any illustrations even if developed for a younger group, the book may include complex concepts that are difficult for all readers, or the like. Thus, readers of books without illustrations may find it difficult to read and understand such books. Additionally, even if a reader understands the book and concepts, the reader may simply just prefer to see illustrations with the text of the story.

One conventional approach has been to map a word or phrase to an image and provide that image, for example, using an electronic device. For example, the reader may read text and then select an unknown word or phrase and the system may then obtain an image corresponding to the selected word or phrase. In other words, the system may parse singular terms or small phrases from the text and may produce an image for each recognizable term. This form of singular term illustration may help a reader envision material elements provided within the text. For example, if a passage explains a short conversation occurring between a dog and cat discussing who looks better in a top hat, a system may produce a picture of a dog, a picture of a cat, and a picture of a top hat. For some readers, these simple illustrations of material objects in a passage may be enough to understand a point. However, the addition of the illustrations for objects in a scene may not be enough information for a reader who does not understand the action present in a passage. For example, the dog and the cat may be passing the top hat back and forth or wearing it in a funny a manner. By simply producing a singular illustration for each of the terms in a passage, verbs or other actions (particularly multiple verbs or actions happening at the same time or in a series) becomes especially hard to convey. In other words, while the conventional system may be employed to produce an image for a single word or phrase, the conventional system does not convey the concept of a passage or story. Thus, the reader may still not be able to understand what is occurring in a passage. Additionally, the production of a single image does not provide cohesive images throughout the story.

Accordingly, the techniques and systems as described herein provide a system and technique for producing a visual storyline for a textual form of a story. The system receives, or otherwise obtains, a story in a text-based format. The system can also capture frequently asked questions and answers or other crowd-sourced information to identify concepts within the story, for example, those concepts that assist in understanding the story. From the text-based story and, if applicable, the crowd-sourced information, the system identifies conversational blocks. To identify the conversational block, the system identifies conversational turns in the story and then groups the conversational turns that are related to a topic into a conversational block. In other words, the system identifies topic switches between conversational turns, marks these topic switches as a conversational block boundary, and groups the conversational turns between boundaries into a single conversational block.

For each of the conversational blocks the system obtains at least one image illustrating a concept contained within the conversational block. To generate the visual storyline, the system obtains a series of images for each of the conversational blocks and orders them based upon the storyline. To maintain cohesiveness or image consistency between images within the visual storyline, the system compares components of the images to determine how similar the images are and then selects images that are similar. Alternatively, the system may generate images for the conversational blocks by parsing images, extracting components that allow for the maintenance of consistency, and then produces an image by merging the extracted components into a single image.

Such a system provides a technical improvement over current systems for producing visual representations of textual stories. Rather than providing an image for a single word or phrase, the system is able to produce images for passages within a story. The system can then order these images based upon the story and provide a visual storyline that relays the concepts of the story in a visual format. Additionally, the system generates images that are cohesive between each of the images within the story, thereby providing a visual storyline that is easy to follow. These techniques provide a system that can produce a visual storyline that can be understood by many readers, thereby providing a more user friendly technique for representing stories. Thus, the described system provides an efficient system for representing stories in a cohesive visual storyline that is not possible using conventional techniques, which, at best, provide images for single words or phrases.

FIG. 1 illustrates a method for generating a visual storyline from a text-based story. At 101 the system may receive or otherwise obtain a textual form of a story. Receiving the story may include a user uploading the story to the system, a user providing a link to the story to the system, a user providing a picture of a cover of the story, a user providing keywords, a title, a book identification number, or the like, to the system. Additionally, or alternatively, the system may access a secondary source (e.g., book database, Internet source, etc.) to obtain a text-based version of the story. For example, if the user provides a title and author of the book, the system may use this information to query a database that contains a plurality of text-based books or stories to retrieve or obtain the story. It is not necessary to provide an entire book or story to the system. In other words, the system can generate a visual storyline from passages of a book or story and does not require the entire book or story to generate the visual storyline. Thus, the user can identify how much or little of a book or story that he/she would like a visual storyline generated for.

Additionally, the system may obtain frequently asked questions (FAQs) and assessments pertaining to the story. These FAQs and answers or assessments may be obtained from one or more secondary sources (e.g., Internet sources, book reviews, databases, etc.). The more information gained prior to generating a visual storyline may help maintain accuracy and consistency throughout a story. For example, referencing the frequently asked questions and their assessments may allow for producing more accurate illustrations in the visual story generator. If a question seems to continually occur at an instance or passage in a story, the visual story generator system may recognize that readers are struggling to interpret the information being conveyed in that passage. The assessments for the frequently asked questions may also be taken into account when producing illustrations. The FAQ assessment(s) may previously provide a reader with a textual answer to why something is happening, who is performing an act, and the like. Accordingly, the assessments may also be used by the system to identify concepts within the story and may also be used in identifying illustrations for generating a visual storyline.

At 102 the system identifies conversational blocks contained within the story. To identify the conversational blocks the system converts the text-based story into dialog form, also referred to as conversation dialog, thereby indicating which characters are providing the dialog. To convert the text-based story into dialog form the system identifies unique characters in a story by analyzing the story, for example, using topic modelling. For example, unique characters may be a protagonist and antagonist, a boy and his dog, a group of friends, any character that provides dialog, or the like. Topic modelling allows the system to identify different concepts within the story and, thereby, identify conversation turns. A single conversation turn is dialog provided by one character without interruption by another character. A second character providing dialog then results in a new conversation turn. In other words, a conversation turn is consecutive dialog that is identified as belonging to a single character. A new conversation turn occurs when another character provides dialog.

Additionally, in converting the story into dialog form, the system identifies important phrases in the story. The system may make this identification using natural language processing techniques, concept identification techniques, and the like, to identify important concepts. Additionally, the system may use the additional information that was obtained, for example, the FAQs and corresponding assessments. A visual storyline generator may identify important phrases when determining the basis of conversation, beginning and end points of a conversation, and may also use a score when determining the level of importance. Once the important information is identified in a system (both important characters and important phrases), the system may remove all text which is deemed unnecessary. Text that may be deemed unnecessary or unimportant may include information that may not fit into a conversation, information that is not vital to the storyline, or the like. For example, in the passage, "Joey likes to play baseball. He plays first base but wants to play third base," Joey, baseball, first base, and third base are all labeled as either unique characters or important phrases; however, terms such as 'like to play' and 'but wants to play' may be labeled as unnecessary and are removed.

After the removal of all unnecessary text, a visual storyline generator may generate conversational blocks from the remaining dialog. To generate the conversational blocks the system may identify topic switches between conversational turns. Identifying the topic switches may include using topic modelling to assign each conversational turn to a particular topic. The location between two conversational turns that is identified as a topic switch is identified as a conversational block boundary. The conversational turns that occur between two boundaries are then grouped into a single conversational block. The system attempts to generate a minimal number of conversational blocks that maximize the information gain within the conversation blocks by including the least number of conversation turns or snippets required for conveying the concepts. In other words, the system generates conversational blocks that provide the most detail in understanding a conversation with the least number of conversation turns and conversation blocks required for providing this understanding. In generating a minimal number of conversational blocks that maximize the information gain, a system may recursively filter through conversational blocks until the cognitive load of all conversational blocks is determined to be nominal.

Figure 2:
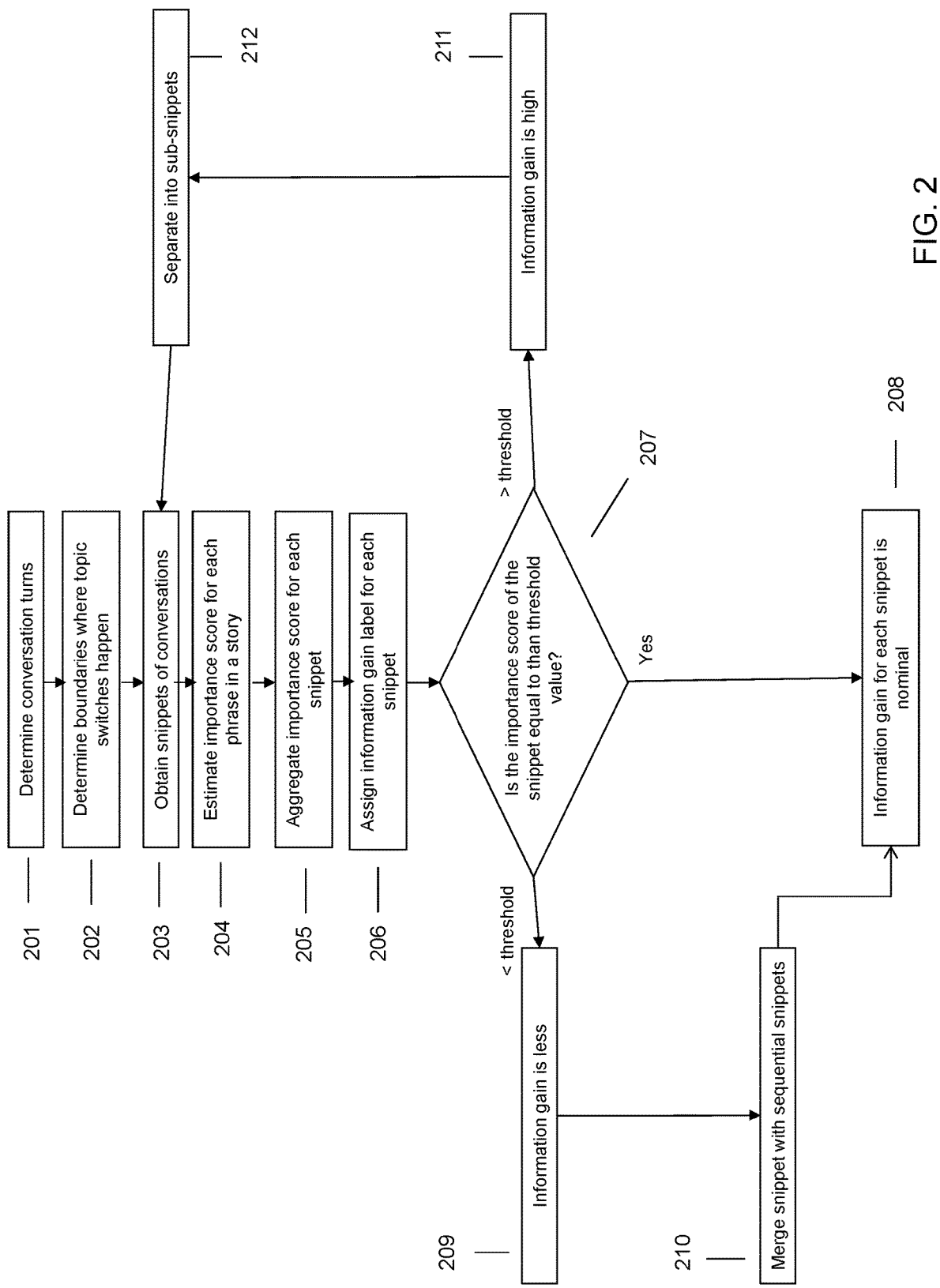
FIG. 2 illustrates a method for identifying conversational block boundaries and generating the conversational blocks.

FIG. 2 illustrates a method for identifying conversational block boundaries and generating the conversational blocks. As explained above the system determines conversation turns at 201 and identifies the boundary between two conversation turns where a topic switch happens at 202. The system obtains a snippet of conversation at the boundary at 203. This snippet may include the conversational turn before the boundary and the conversational turn after the boundary, a conversational turn that has not been assigned to a conversational block yet, or the like. The system may estimate the information gain for each snippet by estimating an importance score the snippet. To estimate the importance score the system may estimate an importance score for each phrase within the textual story at 204, for example, by analyzing the frequently asked questions and corresponding assessments, using a natural language processing technique, using a language analysis technique, or the like. As previously mentioned, unique characters and important phrases may be utilized in determining the information gain at an instance. The importance score for each character represented within the snippet and each phrase contained within the snippet can then be aggregated to produce an importance score for each snippet 205.

At 206, an information gain label may be assigned to each snippet. The information gain of a snippet may be determined by a comparison of the importance score of snippet to that of a predetermined threshold value or threshold range. The threshold value may be provided by a user, a default value, or the like. Comparison of the importance score of the snippet to the threshold value may produce an information gain value at 207, where nominal information gain, or in some instances less nominal gain, is the end goal for all snippets at 208. At instances where the information gain of a snippet may be less than the threshold value, 209, the snippet may be merged with sequential snippets, either before or after the target snippet, if the information gain of the combined sequential snippets is nominal or less at 210. If the information gain of a snippet, either a combined snippet or an original snippet, is determined as high or greater than the threshold value at 211, the snippets may be separated into sub-snippets. The system may then recursively perform the steps until the information gain of the sub-snippets produced is considered to be nominal. The use of a consistent threshold value for comparisons maintains a nominal amount of information gain for each snippet while producing a minimal amount of snippets within a conversational block. Thus, the conversational block boundaries are identified.

At 103 the system can determine whether an image can be obtained for each of the conversational blocks. To obtain an image for each conversational block the system may extract concepts from the conversational block, for example, based upon the topic modelling, the frequently asked questions and corresponding assessments, a language analysis technique, or the like. The system may then obtain an image for each of the extracted concepts. To obtain the image the system may perform unsupervised semantic clustering of pairs of images and conversation. In other words, the system may obtain multiple images for a conversation block and associate each image and conversation as a pair.

To perform the clustering the system may extract the cognitive load of the conversation snippet or conversational block. The cognitive load is based upon the characters, each being classified based upon the viewpoint of the character within the conversational block (e.g., first person, second person, third person, etc.), the keywords within the conversational block, and the sentiment of the character. The visual storyline generator may also extract image set features from a snippet or conversational block, to generate a neighborhood graph. To generate a neighborhood graph the segmented-region-features from the image are extracted to perform object-concept recognition within an image that has been identified for a conversation block. The object-regions are used to create the neighborhood graph and may take into account depth of an image, for example, using a depth map. The neighborhood graph is then converted into vector form using a neural embedding space.

The system can then create a cognitive-load-feature vocabulary by creating a mapping between cognitive-load-features and the corresponding neighborhood graph-vector. In using a vector-based image mapping system and a cognitive-load-feature vocabulary, a visual storyline generator may be able to quickly substitute characters or emotions to produce images, and may have the abilities of fast performance, and accurate and consistent character usage. For example, if an image requires a pink stocking cap and the selected image has a red top hat, the system can use the cognitive-load-feature vocabulary to substitute the red top with a pink stocking cap of a different image. In other words, the system may layer multiple images, each having different features corresponding to the conversational block, into a single image. There may be an instance where multiple neighborhood graphs may be utilized in a single image. In these cases, a visual storyline generator may synthesize the multiple neighborhood graphs, meaning a combination of graphs may take place to produce an image(s) for a snippet or conversational block. Temporal semantics may also be of importance when producing images for conversational blocks. Temporal semantics may cover actions that may need more than one still image to illustrate a motion, e.g., a character punching another leading to a character falling off a balcony.

Converting each identified conversation block into a real scene visual image may be personalized to the derived dimensions in the conversation snippet and may also be the context of the entire visual story flow. Personalization may be achieved by capturing the importance of characters, emotions present in a scene, intents, expression captured from a conversation snippet, or the like, and transferring them to a visual scene by varying parameters (e.g., zoom, point of view, object emotion, color, etc.). In other words, the system may generate an image where each object has the parameter identified from the conversation block. For example, a more important character may be provided in the image foreground as opposed to a less important character that is provided in the background. As another example, if the conversational block identifies an object as having a particular color, the system may ensure that the object is that color in the image. A user may be able to alter and personalize the images produced for a conversational block.

If an image cannot be obtained or generated for each conversational block at 103, the system may attempt to find a new image for the conversational block at 105. If, however, an image can be obtained or generated for each conversational block at 103, the system may generate a visual storyline from the images at 104. To generate the visual storyline the system may take all the images for the conversational blocks and order them based upon the story. When generating the visual storyline the system may maintain cohesiveness or consistency between the images of the storyline. As an example, if a hat within one image is green, the system may ensure that all images that include the hat represent the hat as green. Thus, the system may refine the images to maintain consistency between the images. This refinement may include selecting images that have similar features by comparing the neighborhood graph generated for an image to the neighborhood graph of another image corresponding to a different conversational block.

Additionally or alternatively, a user can provide feedback regarding the image selected for a conversational block and a new image may be selected or generated for the conversational block based upon the user feedback. For example, the user can select different portions of an image and mark or otherwise indicate that these portions should be maintained within the image and may mark other portions that should be changed. In this case, the system can update the image based upon the user constraints identified. The system can also use constraints identified in one image as constraints for other images. For example, if the user identifies that one object should be changed in one image, the system may modify that same object in all images that the object appears.

Figure 3:
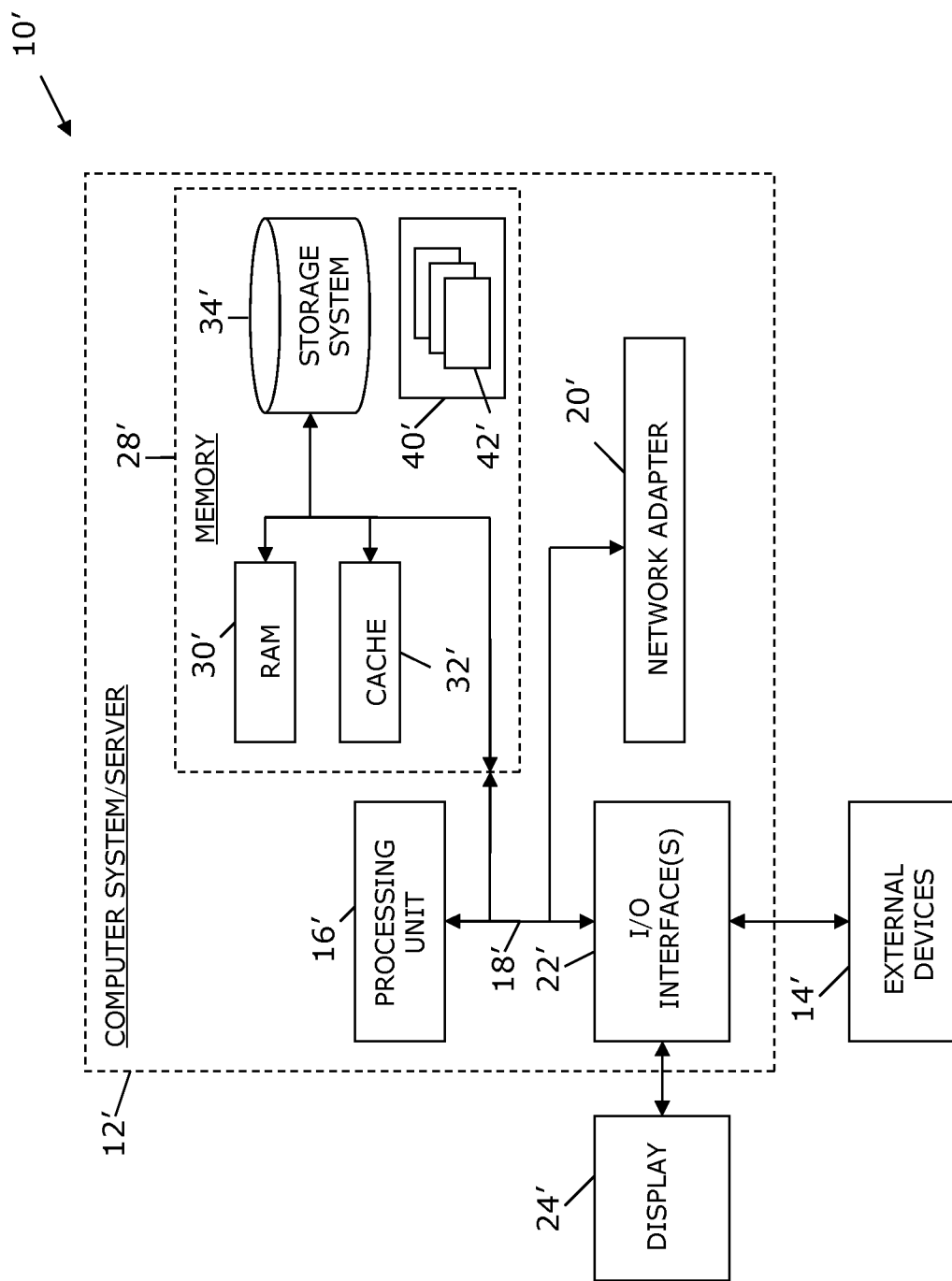
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for representing stories to be understood by many readers by generating a visual story from a text-based version of a story, comprising:
   receiving, at an information handling device, the story, wherein the story is received in a text-based format;
   identifying, using at least one processor, conversational blocks contained within the story, wherein the identifying conversational blocks comprises (i) identifying conversational turns within the story, (ii) identifying topic switches between conversational turns, and (iii) grouping conversational turns occurring between topic switches into a conversational block;
   for each of the conversational blocks, obtaining at least one image illustrating the corresponding conversational block, wherein the obtaining comprises (i) extracting concepts from the conversational block and (ii) identifying images illustrating the concepts; and
   generating, using at least one processor, a visual storyline representing the story by ordering the images obtained for each of the conversational blocks, based upon an order of the conversational blocks within the story, wherein the generating comprises refining the images to maintain consistency between the images, thereby providing the visual story from the text-based version of the story.

2. The method of claim 1, wherein the receiving further comprises receiving (i) frequently asked questions corresponding to the story and (ii) assessments of the frequently asked questions; and
   wherein the extracting concepts comprises using the frequently asked questions and the assessments to identify important concepts.

3. The method of claim 1, wherein the identifying topic switches comprises using topic modelling to determine boundaries where a topic switch occurs.

4. The method of claim 1, wherein the identifying conversational blocks comprises determining an information gain score for each of the conversational turns within the conversational block by computing an importance score for each of the conversational turns.

5. The method of claim 4, wherein the identifying conversational blocks comprises reducing the conversational turns within a conversational block by removing conversational turns having an importance score below a predetermined threshold.

6. The method of claim 1, wherein the obtaining at least one image comprises (i) identifying importance of each character within a conversational block with respect to the other character within the conversational block and (ii) selecting an image illustrating the characters having an importance greater than a predetermined threshold.

7. The method of claim 1, wherein the obtaining at least one image comprises (i) selecting a plurality of images illustrating the corresponding conversational block, (ii) extracting features from each of the plurality of images, and (iii) generating a graph for each of the plurality of images based upon the extracted features.

8. The method of claim 7, wherein the refining the images comprises selecting images having similar features by comparing (i) the graph generated for an image corresponding to a conversational block to (ii) the graph generated for an image corresponding to another conversational block.

9. The method of claim 7, wherein the obtaining at least one image comprises building an image from the graph by (i) selecting images corresponding to the features within the graph and (ii) layering the selected images into a single image.

10. The method of claim 1, wherein the refining comprises (i) receiving user feedback regarding the image selected for the conversational block and (ii) selecting a new image for the conversational block based upon the user feedback.

11. An apparatus for representing stories to be understood by many readers by generating a visual story from a text-based version of the story, comprising:
at least one processor, and
a non-transitory computer readable storage medium having computer readable program code embodied therewith and executable by the at least one processor, the computer readable program code comprising:
computer readable program code configured to receive, at the apparatus, the story, wherein the story is received in a text-based format;
computer readable program code configured to identify conversational blocks contained within the story, wherein the identifying conversational blocks comprises (i) identifying conversational turns within the story, (ii) identifying topic switches between conversational turns, and (iii) grouping conversational turns occurring between topic switches into a conversational block;
for each of the conversational blocks, computer readable program code configured to obtain at least one image illustrating the corresponding conversational block, wherein the obtaining comprises (i) extracting concepts from the conversational block and (ii) identifying images illustrating the concepts; and
computer readable program code configured to generate a visual storyline representing the story by ordering the images obtained for each of the conversational blocks, based upon an order of the conversational blocks within the story, wherein the generating comprises refining the images to maintain consistency between the images, thereby providing the visual story from the text-based version of the story.

12. A computer program product for representing stories to be understood by many readers by generating a visual story from a text-based version of the story, comprising:
a non-transitory computer readable storage medium having computer readable program code embodied therewith, the computer readable program code executable by a processor and comprising:
computer readable program code configured to receive, at the processor, the story, wherein the story is received in a text-based format;
computer readable program code configured to identify conversational blocks contained within the story, wherein the identifying conversational blocks comprises (i) identifying conversational turns within the story, (ii) identifying topic switches between conversational turns, and (iii) grouping conversational turns occurring between topic switches into a conversational block;
for each of the conversational blocks, computer readable program code configured to obtain at least one image illustrating the corresponding conversational block, wherein the obtaining comprises (i) extracting concepts from the conversational block and (ii) identifying images illustrating the concepts; and
computer readable program code configured to generate a visual storyline representing the story by ordering the images obtained for each of the conversational blocks, based upon an order of the conversational blocks within the story, wherein the generating comprises refining the images to maintain consistency between the images, thereby providing the visual story from the text-based version of the story.

13. The computer program product of claim 12, wherein the receiving further comprises receiving (i) frequently asked questions corresponding to the story and (ii) assessments of the frequently asked questions; and
wherein the extracting concepts comprises using the frequently asked questions and the assessments to identify important concepts.

14. The computer program product of claim 12, wherein the identifying topic switches comprises using topic modelling to determine boundaries where a topic switch occurs.

15. The computer program product of claim 12, wherein the identifying conversational blocks comprises determining an information gain score for each of the conversational turns within the conversational block by computing an importance score for each of the conversational turns.

16. The computer program product of claim 15, wherein the identifying conversational blocks comprises reducing the conversational turns within a conversational block by removing conversational turns having an importance score below a predetermined threshold.

17. The computer program product of claim 12, wherein the obtaining at least one image comprises (i) identifying importance of each character within a conversational block with respect to the other character within the conversational block and (ii) selecting an image illustrating the characters having an importance greater than a predetermined threshold.

18. The computer program product of claim 12, wherein the obtaining at least one image comprises (i) selecting a plurality of images illustrating the corresponding conversational block, (ii) extracting features from each of the plurality of images, and (iii) generating a graph for each of the plurality of images based upon the extracted features.

19. The computer program product of claim 18, wherein the refining the images comprises selecting images having similar features by comparing (i) the graph generated for an image corresponding to a conversational block to (ii) the graph generated for an image corresponding to another conversational block; and
    wherein the obtaining at least one image comprises building an image from the graph by (i) selecting images corresponding to the features within the graph and (ii) layering the selected images into a single image.

20. A method for representing stories to be understood by many readers by generating a visual story from a text-based version of the story, comprising:
    obtaining, at an information handling device, the text-based version of the story;
    converting, using at least one processor, the text-based story into a dialog form, wherein the dialog form comprises conversational turns between at least two characters;
    identifying, from the dialog form, conversational blocks, wherein each of the conversational blocks comprises a plurality of conversational turns related to a topic;
    producing, for each conversational block, at least one illustration, wherein the producing comprises (i) obtaining a plurality of images and (ii) merging portions of the plurality of images to produce an illustration corresponding to the conversational block; and
    generating, using at least one processor, a visual storyline representing the story by ordering the at least one illustration produced for each conversational block based upon the story, thereby providing the visual story from the text-based version of the story.

\* \* \* \* \*